United States Patent [19]

Normann et al.

[11] Patent Number: 5,363,095
[45] Date of Patent: Nov. 8, 1994

[54] DOWNHOLE TELEMETRY SYSTEM

[75] Inventors: Randy A. Normann; Emil R. Kadlec, both of Albuquerque, N. Mex.

[73] Assignee: Sandai Corporation, Albuquerque, N. Mex.

[21] Appl. No.: 79,306

[22] Filed: Jun. 18, 1993

[51] Int. Cl.$^5$ ............................................. G01V 1/00
[52] U.S. Cl. ................... 340/854.7; 340/854.6; 299/1.05
[58] Field of Search ............ 340/854.7, 854.6, 854.8; 299/1.05, 1.4, 30

[56] References Cited

U.S. PATENT DOCUMENTS

| | | | |
|---|---|---|---|
| 4,189,705 | 2/1980 | Pitts, Jr. | 340/854.7 |
| 4,389,645 | 6/1983 | Wharton | 340/854.7 |
| 4,506,745 | 3/1985 | Bjor | 175/45 |
| 4,681,160 | 7/1987 | Fineberg. | |
| 4,893,354 | 1/1990 | Janzen et al. | 340/854.7 |
| 5,160,925 | 11/1992 | Dailey | 340/854.6 |

Primary Examiner—J. Woodrow Eldred
Attorney, Agent, or Firm—Timothy D. Stanley; George H. Libman

[57] ABSTRACT

A downhole telemetry system is described for optically communicating to the surface operating parameters of a drill bit during ongoing drilling operations. The downhole telemetry system includes sensors mounted with a drill bit for monitoring at least one operating parameter of the drill bit and generating a signal representative thereof. The downhole telemetry system includes means for transforming and optically communicating the signal to the surface as well as means at the surface for producing a visual display of the optically communicated operating parameters of the drill bit.

18 Claims, 6 Drawing Sheets

DOWNHOLE TELEMETRY SYSTEM

The United States Government has rights in this invention pursuant to Contract No. DE-AC04-76DP00789 between the Department of Energy and American Telephone and Telegraph Company.

BACKGROUND OF THE INVENTION

The present invention relates generally to measurement while drilling (MWD) systems and more particularly, to an optical telemetry system for facilitating the transmission of downhole drill bit operating parameters to the surface during ongoing drilling operations.

The advantages of obtaining downhole data during drilling operations are well known. The primary focus of MWD systems has been to collect data so as to permit more economical and efficient operation of a drill bit and hence, the drilling operation itself. In the quest to obtain such information in real-time, a variety of telemetry systems have been developed to communicate downhole information regarding drill bit performance to the surface whereby such information can be utilized to control the drilling process as described by Dailey in U.S. Pat. No. 5, 160,925. Such prior telemetry systems have employed one or more of the following communications schemes: 1) mud pressure pulsation, 2) hard-wired connections, 3) acoustic waves, and 4) electromagnetic waves.

In mud pressure pulse systems, the drilling mud pressure in the drill string is modulated. The pressure pulse travels up the mud column at or near the velocity of sound in the mud. The rate of transmission of data, however, is relatively slow due to pulse spreading, modulation rates and other disruptive forces, such as ambient noise in the drill string.

Hard-wired connectors have also been proposed to provide a hard-wired connection from the drill bit to the surface. There are a number of advantages to using hard-wired systems e.g. the ability to transmit data at a high rate, to send power downhole; and the capability of two-way communications.

The transmission of acoustic signals through a drill pipe offers another possibility for communication of downhole information. In such system, an acoustic generator is located downhole near or in the drill collar. However, a large amount of power is required downhole to generate an acoustic signal with sufficient energy to be detected at the surface.

The last major technique for transmission of downhole information is the use of electromagnetic (EM) waves through the drill pipe. In this system, downhole data is input to an antenna positioned downhole in a drill collar. Typically, a large pickup antenna is located around the drill fig at the surface to receive the EM signal.

Thus, while the advantages of obtaining operating parameters of a drill bit during ongoing drilling operations are well known, to date no one has successfully developed a telemetry system for communicating the operating parameters of a drill bit used as part of coring operations to obtain core samples of the earth's subterranean formations. The operating parameters of the drill bit during coring operations are especially critical because such things as drill bit temperature can substantially and adversely affect the material characteristics of the core sample being obtained. Because of the stationary nature of the core catcher barrel and its retrieval line relative to the rotary motion of the drill bit, positioning of a telemetry system therewith can be extremely difficult. Moreover, placement of the telemetry system must not interfere with the wire line system used to retrieve core samples from the borehole.

Accordingly, the present invention provides a novel telemetry system for optically communicating operating parameters for a drill bit during ongoing drilling operations, especially coring operations. The telemetry system is packaged in a fully "floating" housing which makes no direct electrical contact with either the drill pipe or the core sample retrieval wire line.

SUMMARY OF THE INVENTION

The present invention relates generally to a downhole telemetry system for communicating to the surface drill bit operating parameters during ongoing drilling operations. In particular, a sensor is mounted with the drill bit to obtain one or more operating parameters thereof and a transmitter mounted therewith optically communicates the operating parameters to the surface. The sensors can be adapted to monitor drill bit operating parameters selected from the group including: weight on bit, torque, temperature, vibration, strain and shock, and can also provide measures of selected formation properties, such as radioactivity. Preferably, light emitting diodes can be employed to communicate the operating parameters in an infrared beam of light up the borehole. Additionally, the telemetry system can include a photo sensor at the surface of the borehole to receive the infrared beam of light and transform it into a visual display of the operating parameter being monitored.

The telemetry system is packaged in a floating housing within the drill pipe which makes no direct electrical contact with either the drill pipe or a core retrieval wire line. The housing includes biased detents for positioning the telemetry system in proximity with the drill bit. In particular, the detents are spring-loaded so as to extend the detents radially outward and engage a circumferential positioning grove within the interior passageway of the drill pipe. These and other advantages of the present invention will be described in more detail below in conjunction with the attached drawings.

DETAILED DESCRIPTION OF THE INVENTION

The present invention relates generally to a downhole telemetry system for communicating downhole information to the surface during ongoing drilling operations.

While the focus of present MWD systems has generally been limited to conventional borehole drilling operations, a need has arisen in coring operations to monitor selected drill bit operating parameters as well as monitor selected formation properties. However, because of coring drill bit design and the general practice of coring in a dry borehole, especially in formations containing, or suspected of containing, hazardous waste materials, attempts to use existing MWD systems have been largely unsuccessful. Moreover, since every mechanical part in the drilling string is moving relative to every other part, direct electrical contact between a downhole sensor and the surface is extremely difficult.

Figure 1:
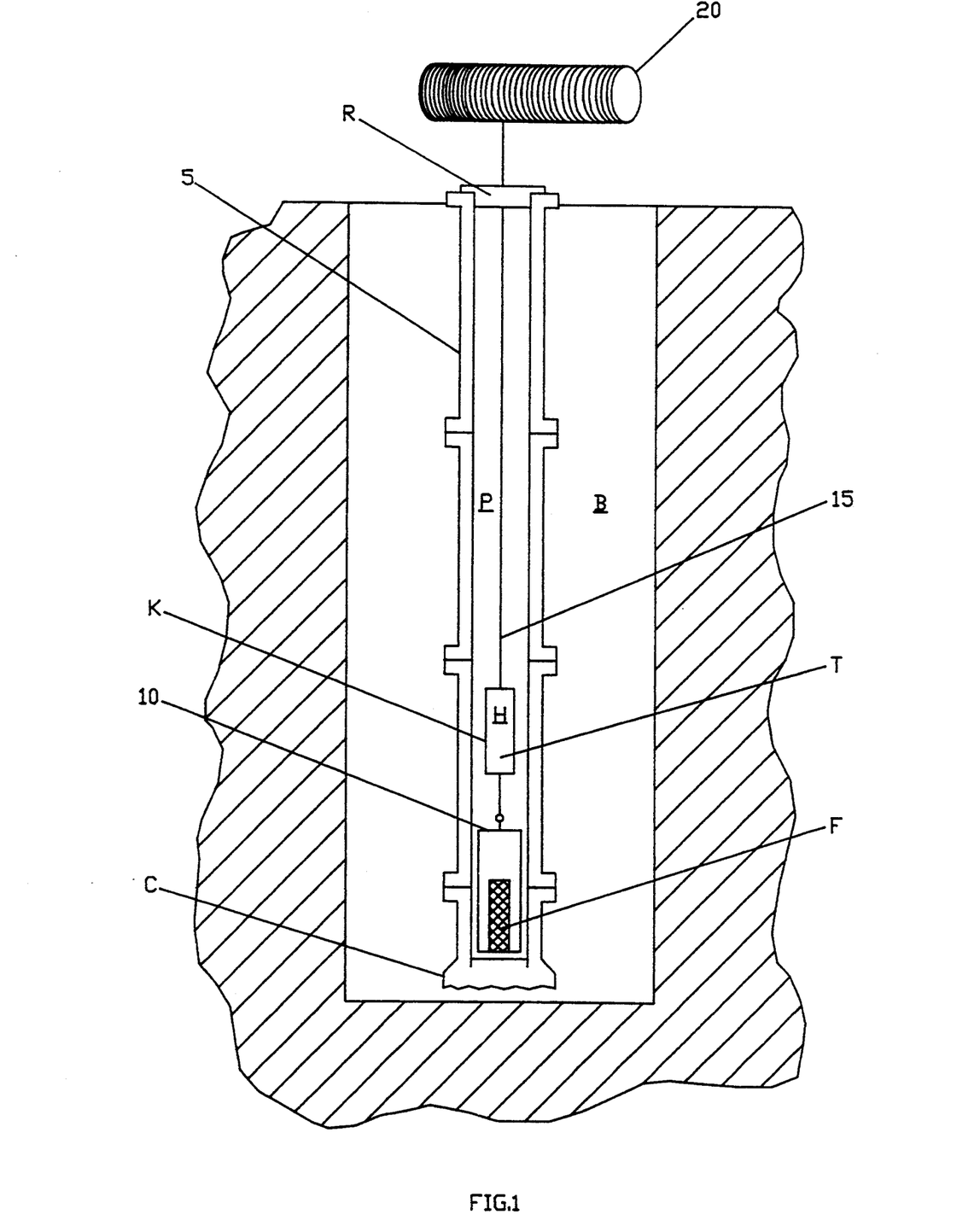
FIG. 1 is a schematic overview of the present invention.

Looking first to FIG. 1, a general overview of the present invention is provided. A borehole B is shown from which its desirable to obtain core samples of the earth's subterranean formations. A drill pipe 5 and its connected drill bit C are used to cut out core samples. A core catcher barrel 10 is suspended within the drill pipe 5 interior passageway P from the surface with retrieval wire line 15. As the drill pipe 5 rotates and is pushed downward, the core catcher barrel 10 remains stationary relative to the drill pipe 5 and drill bit C. When the core catcher barrel 10 is filled with a freshly cut core sample F, both can be brought to the surface by paying in the wire line 15 with drum 20 or the like.

Unlike prior telemetry systems, the present invention packages its telemetry system T in a floating housing H whereby no direct electrical contact is made with either the retrieval wire line 15 or the drill pipe 5. As will be described in more detail below, the telemetry system T can be positioned in the interior passageway P a selected distance from the drill bit C with biased detents K mounted with the housing H. The telemetry system T makes use of separate signal technologies to communicate drill bit operating parameters to the surface. In particular, information from sensors (not shown) mounted in close proximity with the drill bit C is communicated to the telemetry system T with an electromagnetic transformer (not shown). The primary coil of such transformer is mounted within the housing H and the secondary coil of such transformer is located within the drill pipe 5. Within housing H, an optical driver circuit (not shown) can be employed to optically communicate such information to the surface which can be received by an optical receiver R. The received information can then be processed and displayed with a display unit (not shown).

Normally light can be transmitted only a few hundred feet as the intensity of the light signal diminishes by a factor of $1/D^2$, where D is the distance between a transmitter and a receiver. However, inside the drill pipe 5, this factor comprises only a part of the reduction in intensity of the light. There is another component of the light which diminishes linearly and which begins to dominate as distance D approaches 100 ft. This component allows light to be theoretically detectable for hundreds of feet. To obtain distances greater than that, repeater or relay stations (not shown) can be use as with more conventional RF transmissions.

Figure 2:
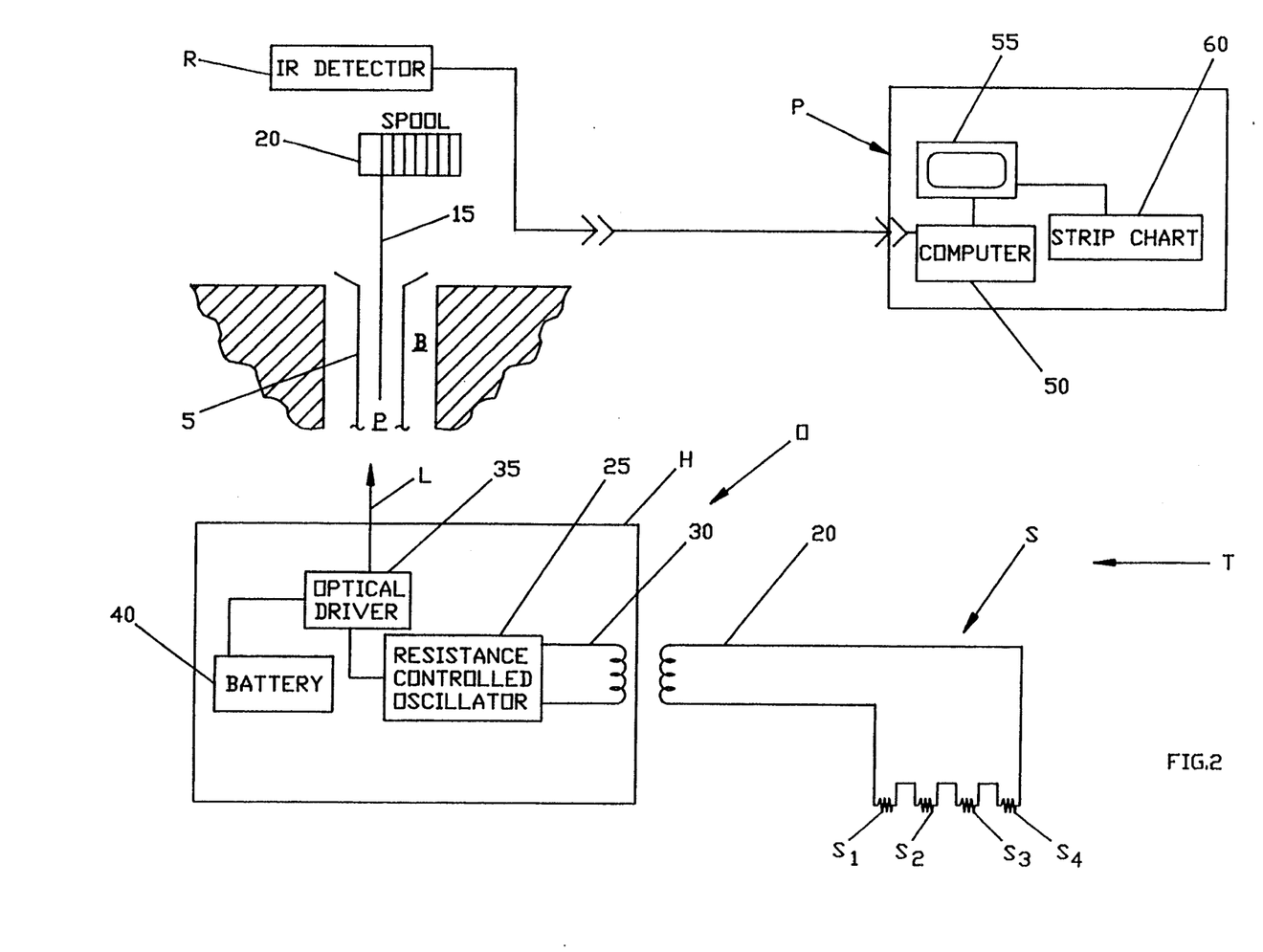
FIG. 2 is a more detailed depiction of the present invention.

Looking now to FIG. 2, a more detailed schematic view of the downhole telemetry system T of the present invention will be described. The telemetry system T comprises: a sensor S positioned with a drill bit in borehole B; an optical transmitter O within housing H and a spaced distance from the drill bit adapted to optically communicate to the surface of the borehole B operating parameters of the drill bit measured by the sensor S; an optical receiver R at the surface adopted to receive the optically communicated parameter; and a display system D for transforming the optically communicated parameter into a visual display.

More specifically, the sensor S can include a plurality of known sensors for measuring one or more operating parameters of the drill bit. Those skilled in the art will recognize that downhole sensors typically mounted with a drill bit can include e.g. temperature, weight-on-bit, torque, vibration, strain, shock, etc. Additionally, magnetometers for locating the drill bit as well as radiation monitors for determining formation properties can also be included with the telemetry system T but need not be mounted with the drill bit. Sensors which vary resistance proportional to a stimulus being measured are particularly useful. Typical of such sensors are thermistors and strain gauges. Alternatively, AC sensors which vary frequency proportional to the stimulus being measured can also be used e.g., accelerometers for measuring vibration and shock.

In one embodiment, the sensor S comprises a plurality of positive coefficient temperature thermistors $S_1 \ldots S_n$ connected in series and integrally mounted with the drill bit so as to obtain an accurate measure of the proper drill bit operating temperature. In coring operations, wherein specifically adapted drill bits cut out cylindrical samples of the earth's subterranean formations, drill bit temperature above prescribed levels can adversely effect the material properties of the sample. As such, close scrutiny of drill bit temperature is required. As will be discussed more completely below, the thermistors $S_n$ are serially connected as part of secondary coil circuit 20.

The optical transmitter O is positioned within interior passageway P of drill pipe 5 a spaced distance from the sensors $S_n$ and comprises a resistance controlled oscillator circuit 25 having a primary coil 30. In particular, the resistance oscillator circuit 25 was designed to operate in a range of 300 to 1200 Hz. As will be described in more detail below, primary coil 30 and secondary coil 20 are in electromagnetic proximity such that variations in resistance of the thermistors $S_n$ result in a change in frequency $f_i$ of operation in the resistance controlled oscillator circuit 35. Such change in frequency $f_1$ can be communicated to an optical driver circuit 35. Both the optical driver circuit 35 and the primary and secondary coil circuits 20, 30 can be powered by a battery 40 within telemetry housing H Preferably, the optical driver circuit 35 includes a plurality of light emitting diodes (LED) not shown which emit near infrared light at a frequency related to the frequency $f_i$. While LED's have been described, those skilled in the art will recognize that other solid state light emitters can be used, e.g. laser diodes.

In operation, changes in resistance of the thermistors $S_n$ results in a change in the frequency of operation the LED's. However, any pulse-modulation method can be employed to communicate information with the light beam. Thus, light L from the LED's contains information concerning at least one of the operating parameters of the drill bit C. The light L from the LED's is directed up the borehole B within interior passageway P of drill pipe 5. An implicit limitation of the present telemetry system T is that the interior passageway of drill pipe 5 is dry, i.e., contains no drilling liquid.

At the surface of the borehole B, an optical receiver R is positioned to receive the light L containing the optically communicated information from the optical transmitter O. The optical receiver R comprises a plurality of photo sensors responsive to wavelengths matching those generated by the optical transmitter O. In particular, four infrared detectors are connected in parallel to improve the collection area. Preferably, the photo sensors are reverse polarization diodes such that when no light is beamed up the drill pipe, only a small current is generated. As light impinges on the photo sensors, a measurable current is generated which is proportional in strength to the intensity of the received light. The signal can then be converted to a varying voltage with a voltage converter and then output to the display unit. The signal is communicated to a signal processor 50 whereby the frequency content thereof can be related to an operating parameter of the drill bit, e.g. temperature. Such operating parameter can then be displayed visually either with a monitor 55 or strip chart 60.

Transformer

Figure 3:
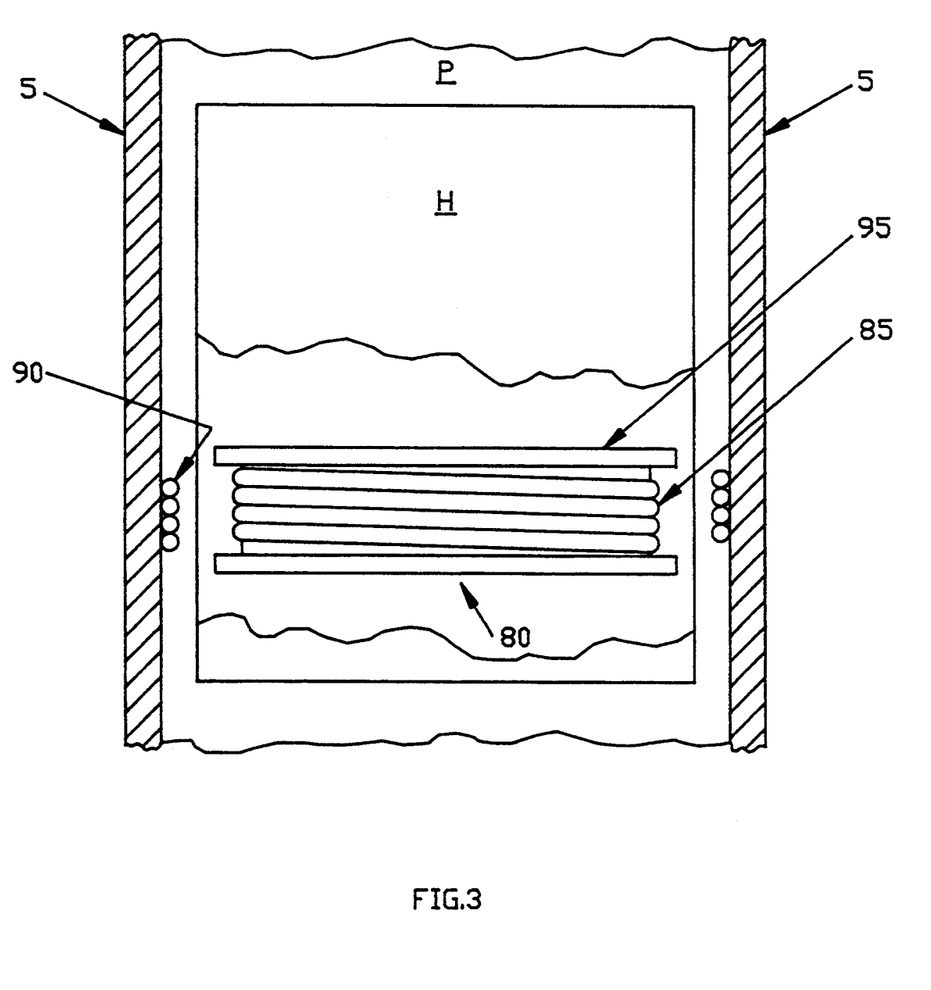
FIG. 3 is a more detailed depiction of the telemetry system of the present invention and its housing.

Looking now to FIG. 3, transformer 80 is designed for efficient coupling of the sensor S with the optical transmitter O. Transformer 80 is adapted to operate at low power, low frequency and is capable of working with a large air gap. The transformer 80 comprises a primary coil 85 mounted within telemetry housing H and a secondary coil 90 mounted internally within drill pipe 5. As described earlier, primary coil 85 is part of a resistance controlled oscillator circuit while secondary coil 90 is part of the sensor circuit. The frequency range of transformer 80 must be kept low because the metallic drill pipe causes magnetic coupling problems at high frequencies (>1 KHz). To accomplish these objectives requires the transformer 80 to have an inductance on the order of ~1H. A large air gap (~0.1 in) between the primary 85 and secondary coils 90 of the transformer 80 is needed to allow the telemetry housing H to pass through the interior diameter of the drill pipe 5 without interference. Unfortunately, such an air gap can degrade the transformers 80 performance by increasing its reluctance. To compensate for such increase in reluctance, the surface area of a bobbin 95 of the primary coil 85 is made large. The bobbin 95 is composed of a powdered iron core. The primary coil 85 is formed about the bobbin 95 and includes 1500 turns of wire and the secondary coil mounted within the drill pipe 5 also comprises 1500 turns of wire for a net inductance of 0.5H.

Optical Transmitter

Looking now to FIG. 3, a more detailed view of the optical transmitter O is provided. Information received from the primary coil 90 of the transformer 85 is communicated to the optical driver circuit including a plurality of LED's $O_n$ mounted on the upper, exterior surface of housing H.

OPTICAL RECEIVER

Figure 4:
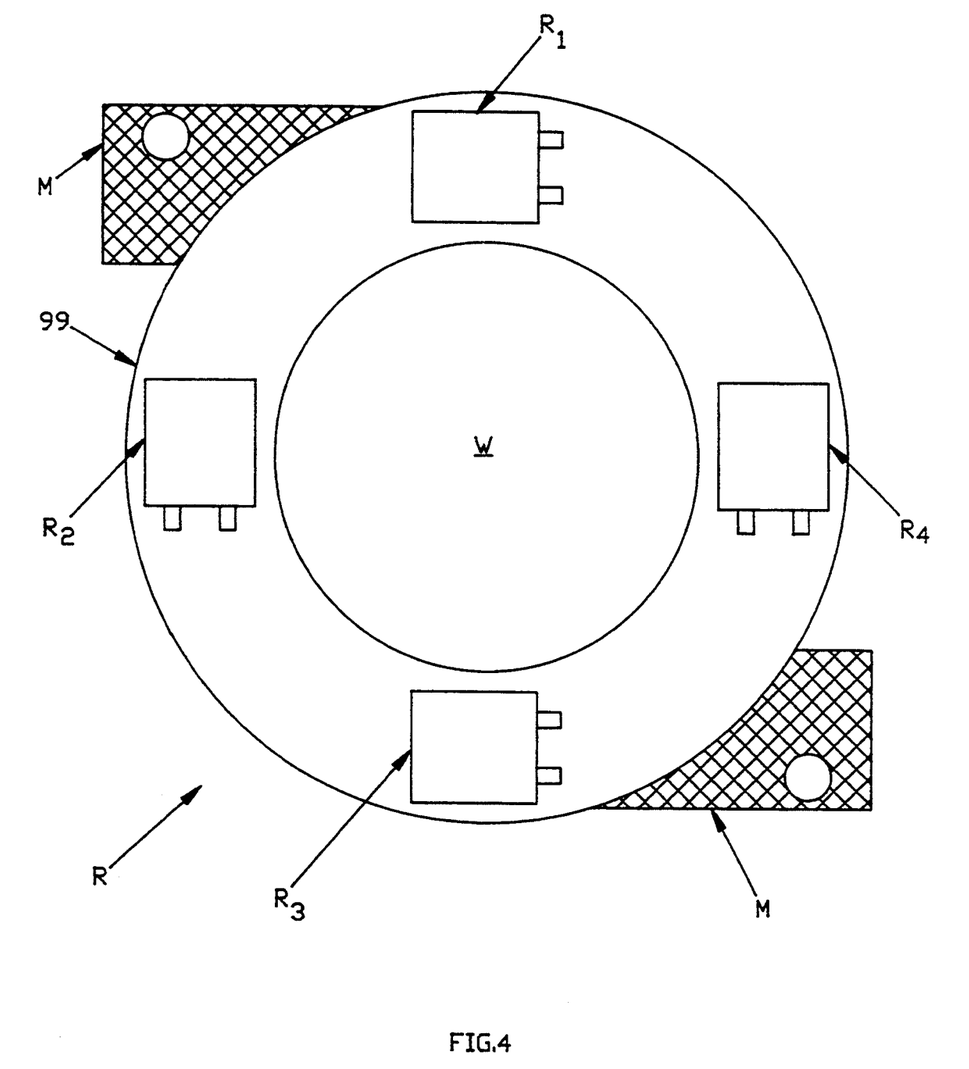
FIG. 4 is a more detailed depiction of the optical receiver of the present invention.

The optical receiver R is depicted in FIG. 4 and comprises a plurality of infrared photo sensors $R_n$ connected in parallel facing towards the optical transmitter O down hole. In particular, the photo sensors $R_n$ are mounted with a circular ring 99 adapted to fit with the drill rig and include mounting bolts for such connection. The receiver R includes a central passageway W whereby the retrieval line 15 may pass through.

Housing for Transmitter

Figure 5:
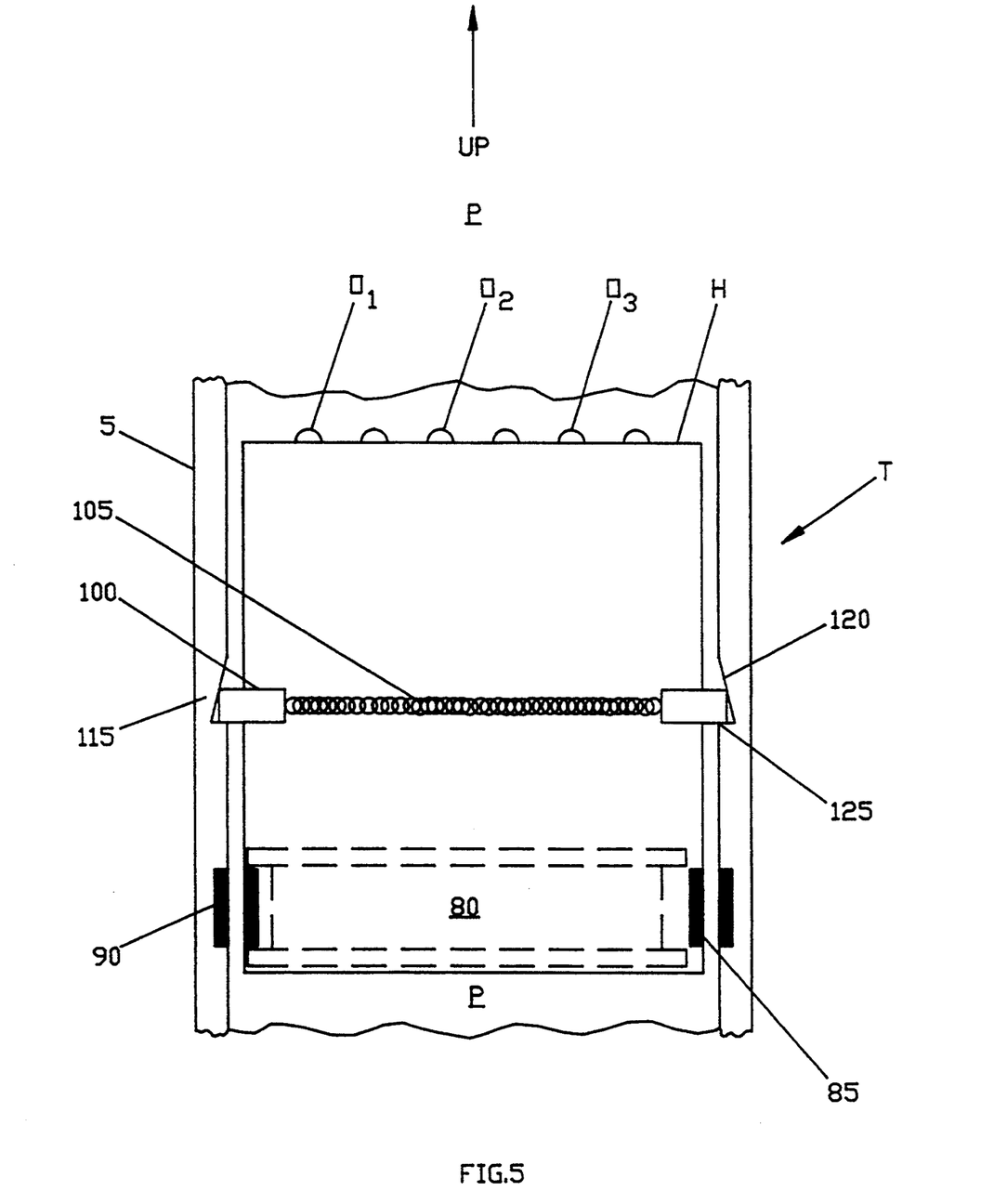
FIG. 5 is a schematic cross sectional view of the telemetry system and its housing in a borehole.
Figure 6:
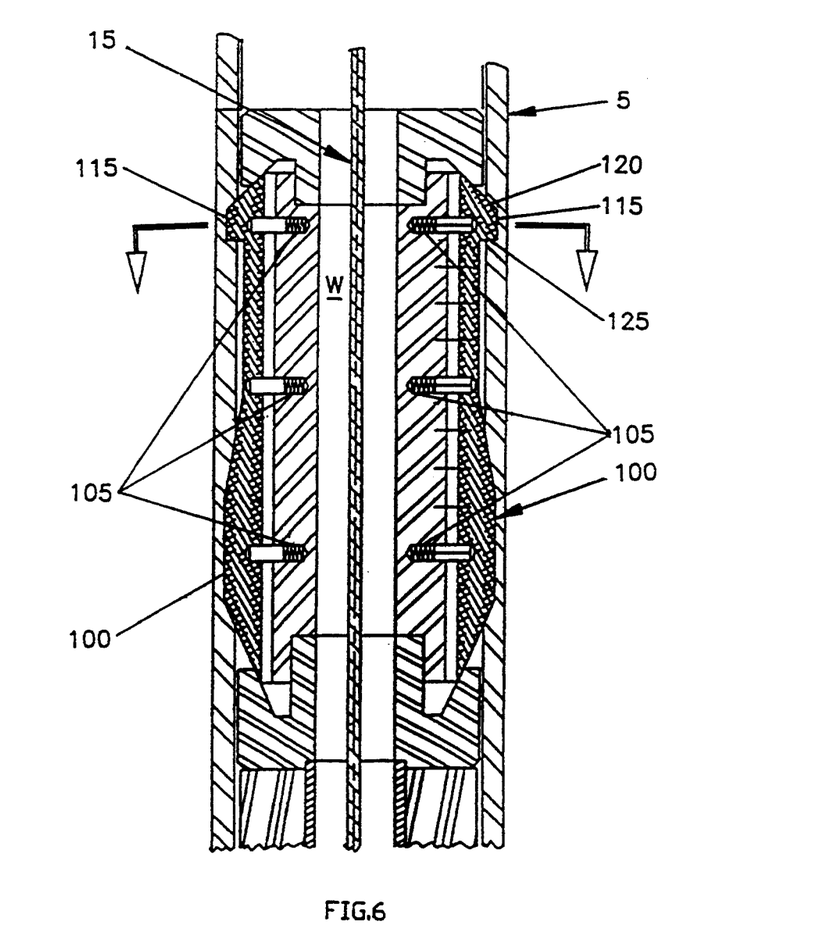
FIG. 6 is a more detailed cross sectional view of the telemetry housing of the present invention.
Figure 7:
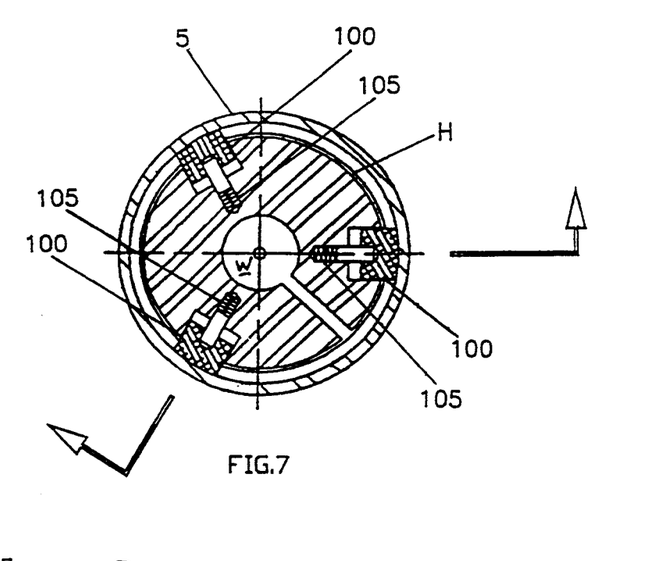
FIG. 7 is a top view of the telemetry housing of FIG. 6.

FIG. 5, 6 and 7 depict the floating housing H used to sealably package the telemetry system T. In particular, the housing H includes spring loaded detents 100 adapted to engage circumferential groove 115 in the interior of drill pipe 5. FIG. 7 depicts a top view of the spring loaded detents 100 wherein three detents 100 are equi-spaced about the circumference of the housing H. The housing H is sized to pass unobstructed through an interior passageway P of the drill pipe 5. While the detents 100 are biased with springs 105 to extend radially outward, they can be compressed radially inward to permit housing H to move unobstructed through the interior passageway P of the drill pipe. However, as the housing H is lowered into the drill pipe, the detents 100 are biased to extend radially outward with spring 105 so as to be in contact with the surface of the interior passageway P. As such, any change in the interior passageway diameter will cause the detents 100 to respond by moving either radially inward or outward.

In order to properly position the telemetry system T within the drill pipe, a circumferential grove 115 is located on the interior passageway P of the drill pipe 5. In particular, the grove 115 includes an upper, tapered edge 120 and a lower, flat landing 125. As a consequence engagement of grove 115 by detent 100, the position of primary coil 85 is fixed relative to secondary coil 90. However, since the upper edge 120 is tapered, the telemetry system T can be withdrawn from the drill pipe.

The housing H also includes a central passageway (not shown) sized to permit retrieval line (not shown) to pass there through. In operation when lowering the housing H into the borehole, the housing H will descend into the drill pipe 5 until the spring biased detents 100 engage the circumferential groove 115. In such position, the housing H can be said to float with the drill pipe 5 since it moves in concert with both the rotary and downward motion of the drill pipe 5 while being suspended over the core catcher barrel and the drill bit. Upon retrieving the core catcher barrel and core sample with the retrieval wire line, the housing H will also be lifted when the upper portion of the core catcher barrel engages its under side.

While applicants have described the present downhole telemetry system with respect to certain features, those skilled in the art will appreciate that modifications thereto can be made without departing from the scope of the claims attached herewith.

We claim:

1. A downhole telemetry system for communicating drilling information to the surface during drilling operations, comprising:

a) sensing means mounted with a drill bit for monitoring at least one operating parameter of the drill bit and for generating a pulse modulated signal representative thereof;

b) telemetry means the transforming and optically communicating the signal up a borehole within the ambient atmosphere and without the use of fiber optic cables; and c) a housing having an interior cavity containing said telemetry means and means for positioning the housing to a circumferential positioning groove located within the interior passageway of a drill pipe, such that the housing moves in concert with the downward motion of the drill pipe.

2. The downhole telemetry system of claim 1, further including receiving means at the surface for receiving the optically communicated signal and displaying at least one operating parameter of the drill bit.

3. The downhole telemetry system of claim 1, wherein said means for optically communicating the signal comprises a light emitting diode.

4. The downhole telemetry system of claim 1, wherein said means for optically communicating the signal comprises a infrared light source.

5. The downhole telemetry system of claim 1, wherein said sensing means comprises a temperature sensor.

6. The downhole telemetry system of claim 1, wherein said receiving means comprises a photo sensor.

7. The downhole telemetry system of claim 1, wherein said means for transforming comprise a resistance oscillator circuit.

8. The downhole telemetry system of claim 1, wherein said sensing means includes means for monitoring the temperature of the drill bit.

9. The downhole telemetry system of claim 1 further including means within the drill pipe for relaying the optically communicated information up the borehole to the surface.

10. A method for communicating downhole information to the surface during ongoing drilling operations, comprising:
   a) positioning a housing having an interior cavity containing optical telemetry means and means for engaging the housing within an interior passageway of a drill pipe, such that, the housing moves in concert with rotary and downward motion of the drill pipe,
   b) sensing at least one parameter at depth during an ongoing drilling operations; and
   c) optically communicating the parameter to the surface within the ambient atmosphere and without the use of fiber optic cables.

11. The method of claim 10, further including sensing the optically communicated parameter at the surface and producing a display thereof.

12. The method of claim 10, wherein the parameter sensed is selected from the group consisting of temperature, weight on bit, torque, strain, shock, vibration and formation radioactivity.

13. The method of claim 10, wherein the step of optically communicating includes beaming an infrared light up a borehole.

14. The method of claim 11, wherein the step of optically communicating includes initially transmitting the parameter as well as re-transmitting the parameter without the use of fiber optic cables at least one relay photo transmitter without the use of fiber optic cables.

15. The method of claim 11, further including means for transforming the sensed parameter into an optical signal.

16. The method of claim 15, wherein the transformer includes a secondary coil circuit with a sensor and a primary coil circuit with light emitting diodes.

17. A downhole telemetry system for communicating drilling information to the surface during drilling operations, consisting of:
   a) sensing means mounted with a drill bit for monitoring at least one operating parameter of the drill bit and for generating a pulse modulated signal representative thereof;
   b) means for transforming the signal into an optical signal and transmitting the optical signal through the ambient atmosphere of an interior passageway of a drill pipe mounted with the drill bit; and
   c) a housing having an interior cavity containing said telemetry means and means for engaging the housing within the interior passageway of the drill pipe, such that, the housing moves in concert with the rotary and downward motion of the drill pipe.

18. A method for communicating downhole information to the surface during ongoing drilling operations, consisting of:
   a) positioning a housing having an interior cavity containing optical telemetry means and means for positioning the housing to a circumferential positioning groove located within the interior passageway of a drill pipe, such that, the housing moves in concert with downward motion of the drill pipe,
   b) sensing at least one parameter at depth during ongoing drill operations; and
   c) communicating the parameter to the surface as an optical signal through the ambient atmosphere of an interior passageway of a drill string.

* * * * *